United States Patent
Gerlach et al.

(10) Patent No.: US 7,395,896 B2
(45) Date of Patent: Jul. 8, 2008

(54) IMPACT ABSORPTION DEVICE FOR VEHICLES

(75) Inventors: Klaus Gerlach, Rötgesbüttel (DE); Olaf Stindl, Bremerhaven (DE); Heiko Jürgens, Rühen (DE)

(73) Assignee: Volkswagen AG, Wolfsburg (DE)

( * ) Notice: Subject to any disclaimer, the term of this patent is extended or adjusted under 35 U.S.C. 154(b) by 369 days.

(21) Appl. No.: 11/155,055

(22) Filed: Jun. 17, 2005

(65) Prior Publication Data

US 2005/0285430 A1    Dec. 29, 2005

(30) Foreign Application Priority Data

Jun. 19, 2004    (DE)    ........................ 10 2004 029 745

(51) Int. Cl.
*B60K 28/10*    (2006.01)
(52) U.S. Cl. .................... 180/274; 280/735; 701/45; 701/47
(58) Field of Classification Search ................. 180/271, 180/274; 280/734, 735; 701/45, 47
See application file for complete search history.

(56) References Cited

U.S. PATENT DOCUMENTS

| | | | | |
|---|---|---|---|---|
| 2,207,666 A | * | 7/1940 | Hirabayashi | ................ 180/275 |
| 3,848,914 A | * | 11/1974 | Wathen | ........................ 293/9 |
| 4,182,529 A | * | 1/1980 | Taylor | ........................ 293/132 |
| 4,365,825 A | * | 12/1982 | Merkle | ........................ 280/777 |
| 5,042,858 A | * | 8/1991 | Schubert et al. | ................ 293/24 |
| 5,451,077 A | * | 9/1995 | Fantauzzo | .................... 280/784 |
| 6,312,038 B1 | * | 11/2001 | Kawamura et al. | ......... 296/68.1 |
| 6,394,535 B1 | * | 5/2002 | Kawamura et al. | ..... 296/187.03 |
| 6,607,212 B1 | * | 8/2003 | Reimer et al. | ................ 280/735 |
| 6,739,635 B2 | * | 5/2004 | Byun | ........................ 293/135 |
| 6,929,296 B2 | * | 8/2005 | Yang | ........................ 293/118 |
| 6,942,261 B2 | * | 9/2005 | Larsen et al. | ................ 293/107 |
| 7,104,354 B2 | * | 9/2006 | Ozaki | ........................ 180/282 |
| 7,137,472 B2 | * | 11/2006 | Aoki | ........................ 180/274 |
| 7,201,249 B2 | * | 4/2007 | Kosaka | ........................ 180/274 |
| 2007/0125588 A1 | * | 6/2007 | Akgun et al. | ................ 180/274 |

FOREIGN PATENT DOCUMENTS

| | | |
|---|---|---|
| DE | 196 02 990 A1 | 8/1996 |
| DE | 103 32 377 A1 | 7/2004 |
| DE | 103 31 862 A1 | 2/2005 |

* cited by examiner

*Primary Examiner*—Toan C To
(74) *Attorney, Agent, or Firm*—Baker Botts L.L.P.

(57) ABSTRACT

It is important to recognize the severity of an accident more accurately and reliably. To do so, the present invention consists of installing a compression element (25) that can be compressed reversibly into an impact absorption device (2) in order to dampen the impact on a vehicle component. A pressure sensor is integrated in this compression element (25) which detects the pressure during compression of the compression element (25). From the pressure signal, data such as the collision speed can be determined and a safety device such as an airbag can be triggered. By doing so, expensive early crash sensors and similar devices become unnecessary, while the severity of an accident can be reliably determined.

22 Claims, 2 Drawing Sheets

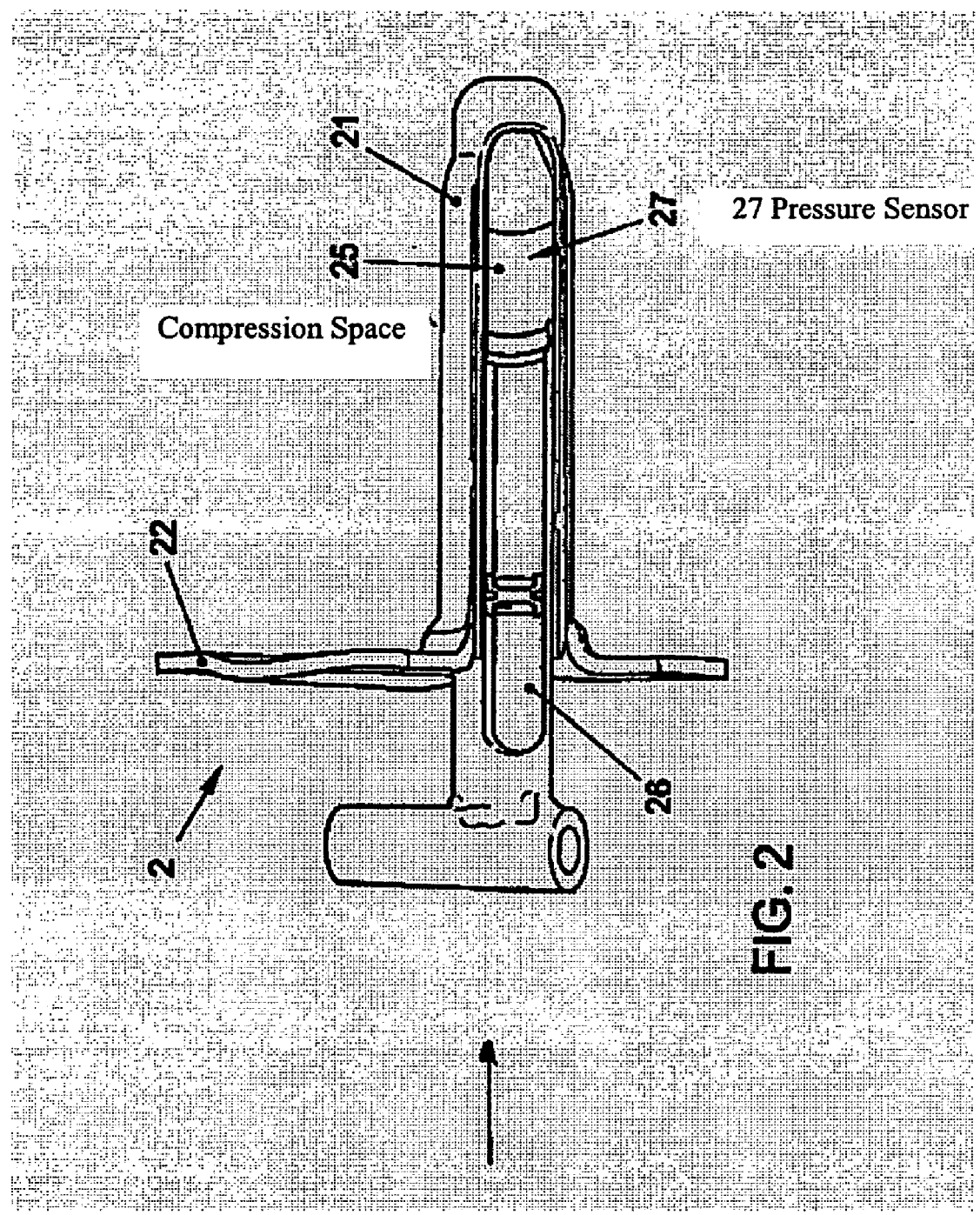

IMPACT ABSORPTION DEVICE FOR VEHICLES

CROSS-REFERENCE TO RELATED APPLICATION

This application claims priority from German Patent Application No. 10 2004 029 745.2, which was filed on Jun. 19, 2004, and is incorporated herein by reference in its entirety.

TECHNICAL FIELD

The present invention relates to an impact absorption device for absorbing impacts on a vehicle's components by using a compression element which can be reversed.

BACKGROUND

The use of energy-absorbing components for the protection of the vehicle frame in a frontal collision is commonly known. In most cases, the protection is provided by a side rail protection component between the front ends of the two side rails of a vehicle's frame and the front cross member.

Such vehicle frame protection components are not to be confused with the component widely known as the bumper of a vehicle. A vehicle's bumper is generally placed in front of the front cross member of the frame. With newer vehicle models, the bumper consists mainly of easily deformable plastic parts which enhance the vehicle's exterior design. However, bumpers are often strengthened mechanically by placing additional plastic parts or energy-absorbing PU foam parts in the cavity between the bumper and the front cross member of the frame. Older models in particular often use bumpers made of steel sheet, aluminum-strengthened steel sheet or similar materials, which are connected to the vehicle frame via flexible hydraulic components, so that the hydraulic components deflect impact collisions which occur at lowest speeds from the frame. Commonly used bumper designs can be found in the automobile engineering handbook by Robert Bosch GmbH, $22^{nd}$ edition, Stuttgart, 1995 on page 686. While the commonly marketed vehicle frame protection components have the purpose of preventing permanent damage to the vehicle frame at higher speeds, such as speeds from 5 to 25 km/h (approx. 3 to 15 miles/h), bumpers only serve to protect the rigid vehicle frame from deformations caused by impact collisions at speeds up to 5 km/h (approx. 3 miles/h). The bumper absorbs most of the impact energy, so that the vehicle's frame is only damaged by much stronger impact forces caused by a collision.

Deformed vehicle frame protection components can easily be exchanged with new components. This makes expensive repairs of frame damages after a collision at moderate speed unnecessary by simply replacing one or several vehicle frame protection devices, considerably reducing repair costs. This is one of the reasons insurers insist on repeated or regular functionality checks of such vehicle frame protection components especially with newly registered cars, before all vehicles of identical design are classified within the same damage class.

The automobile industry has long added pressure and acceleration sensors to different points of a vehicle. These sensors plus their electronic parts (which evaluate the signals) are mostly used as crash sensors, often also as so-called early crash sensors. Early crash sensors emit their signals to a passenger protection system's central controller which uses the data to determine the severity of the accident. Based on the severity determined, a passenger protection device is triggered (sometimes modified) when an additional crash sensor or central controller sensor signal provides sufficient cause to trigger the passenger protection device. For example, an airbag is inflated to the first or second inflation level according to the severity of the accident.

From the German patent disclosure DE 196 02 990 A1 it is also known to determine a vehicle's impact collision from the increase in pressure in a cavity behind a bumper using a pressure sensor. Depending on the pressure sensor data, a passenger protection device is then triggered, such as an airbag, a belt tightening device or similar devices.

German patent registration DE 103 31 862.3 furthermore presents a vehicle protection frame element which is deformed permanently and the cavity of which is equipped with a pressure sensor to measure an increase in pressure during a collision. From the pressure signal, a central controller determines the severity of the collision and triggers the suitable passenger protection device according to need.

Furthermore, the German patent registration DE 103 32 377.5 involves a hydraulic bridging element for bridging the gap between the engine/drive block and a cross member. The forces impacting the vehicle during a collision are used to push the fluid from the fluid reservoir into the hydraulic bridging element. The inserted fluid extends or elongates the hydraulic bridging element in order to bridge the gap between the two components. In this way, additional force paths are created which slow down collision-driven movements of heavy components like the engine/drive block and provide for geometric compatibility in order to protect and relieve the passenger cabin. On the other hand, part of the impact energy can be redirected in order to support the components against the introduced collision forces and against other parts of the vehicle.

SUMMARY

The present invention has the purpose of providing reliable and cost-efficient sensor elements for triggering passenger safety systems.

The present invention fulfills its purpose by an impact absorption device for dampening an impact on a vehicle component by using a compression element that can be compressed reversibly, wherein a pressure sensor is situated in the compression element which can detect the pressure during a compression process of the compression element.

The impact absorption device according can be mounted to a side rail of a vehicle's frame or to a cross member or bumper of the vehicle. The compression element can be decompressed hydraulically or pneumatically. The sensor can be located in the compression element's hydraulic fluid. The course and/or the amount of the pressure increase in the compression element can be registered by the sensor.

A safety system for a vehicle may comprise such an impact absorption device, wherein a safety device can be triggered by a signal from the pressure sensor. The safety device may include an airbag and/or a belt tightening device. A vehicle may comprise such an impact absorption device for dampening an impact on a vehicle component.

An impact absorption device dampens an impact on a vehicle component with a compression element that can be reversibly compressed. A pressure sensor is positioned within the compression element in order to detect the pressure on the compression element during a collision.

By integrating a pressure-sensitive sensor in the compression space of an impact absorber, a reliable triggering of airbags or belt tensioning according to the severity of the accident can be assured.

Preferably, the impact absorption device according to this invention can be mounted on a side rail of the vehicle frame and on the vehicle's cross member or bumper. It is especially beneficial to install piston-like shock absorbers in the cavity of a side rail.

The compression element can also be decompressed hydraulically in order to simply reverse a compression.

It is beneficial to place the pressure sensor within the hydraulic fluid or the pressure space of the compression element for accurate determination of the pressure.

The preferred invention configuration equips a vehicle's safety system with an impact absorbing device in accordance to this invention where a pressure sensor's signal triggers the safety device desired. Such safety device could be an airbag and/or a belt tightening device. Such safety device can be triggered in a very reliable and cost-efficient manner by evaluating the pressure signal from the pressure sensor.

BRIEF DESCRIPTION OF THE DRAWINGS

The present invention is further described in accordance with the drawings attached. The drawings show:

FIG. 2 is a partial cross-section of an impact absorber in accordance with this invention.

DETAILED DESCRIPTION

Figure 1:
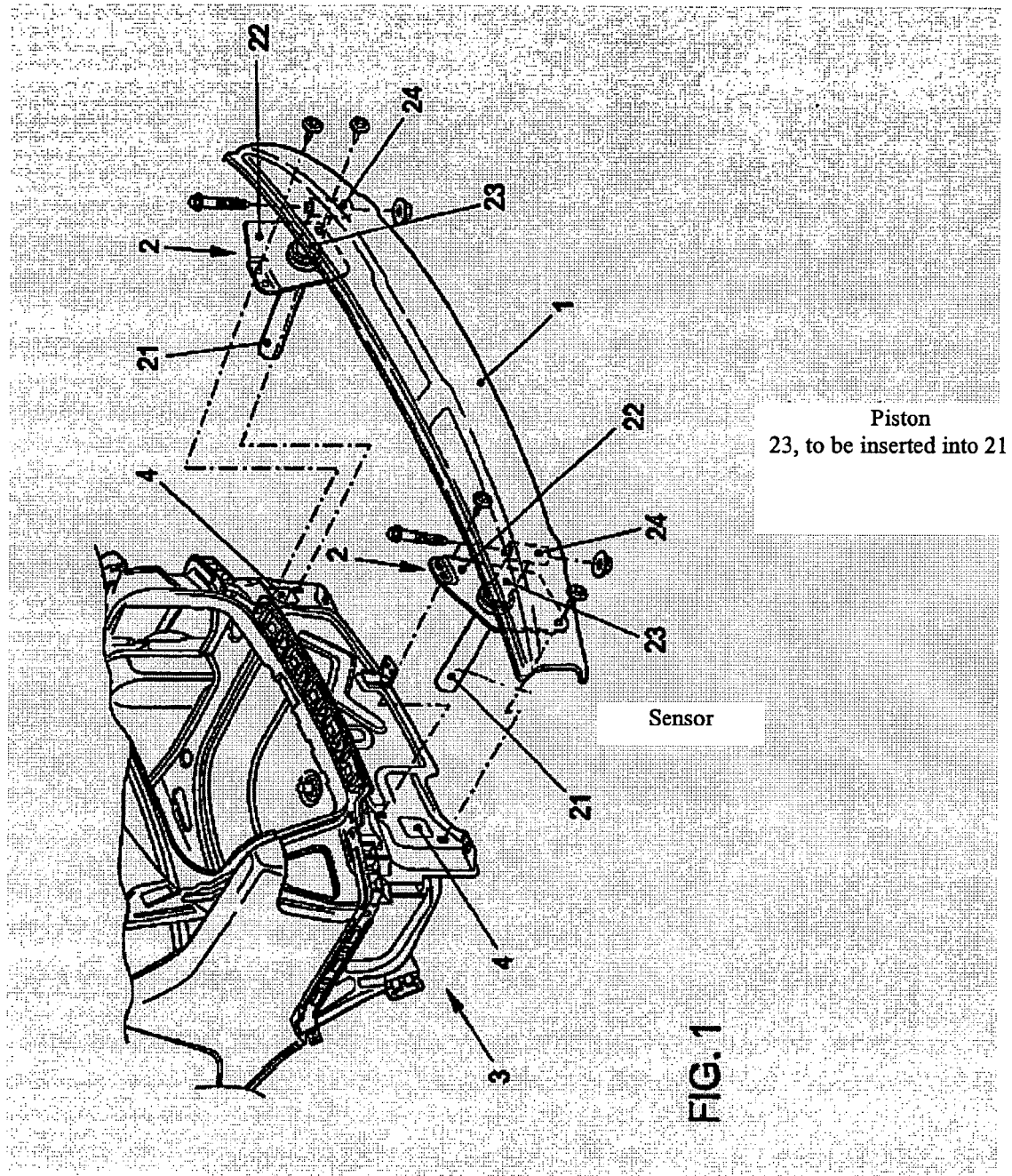
FIG. 1 is an exploded view of the rear part of an automobile with impact absorbers in accordance with this invention.

The embodiment example described in more detail below is the preferred embodiment of the present invention.

FIG. 1 depicts an example of the rear part of a car in an exploded view. Bumper 1 is attached using impact absorbers 2 to a vehicle frame 3. The active part of the impact absorber 2 is mainly cylindrical in shape and is placed in a corresponding enclosure section 21. This cylindrical section 21 is placed into the cavity 4 of a side rail of the vehicle's frame 3. Therefore, the impact absorber 2 does not require a dedicated space.

The impact absorber 2 is screwed to the side rail using a flange-like shield. A cylinder element 23 can be inserted into the cylindrical section 21. It is equipped with a sleeve 24 which is perpendicular to the front side facing outside of the cylinder element. The cross member or bumper 1 is screwed into this sleeve 24.

In the case of an impact on bumper 1, the collision energy is not transferred directly to the vehicle frame 3, but to the reversible impact absorber 2, while the affected cylinder element 23 is pushed into the corresponding cylindrical section 21.

The impact absorbers in accordance to this invention are mounted in the rear of the vehicle corresponding to FIG. 1. However, they can also be used in the front of the vehicle.

FIG. 2 depicts the impact absorber 2 in more detail. The figure is a partial cross-section along its longitudinal axis in order to show the interior components. From the figure, it is clear that the flange-like shield 22 is attached firmly to the cylindrical section 21. The cylinder element 23 with its welded-on, perpendicular sleeve 24 can be inserted with a specific insertion force into the cylindrical section 21.

When the cylinder element 23 is inserted, a compression space 25 within the cylindrical section 21 (filled with hydraulic fluid, for example), is compressed. The hydraulic fluid is pushed into the decompression space 26. After the impact, the hydraulic fluid is then pushed back into the compression space 25, so that the compression space 25 extends again. Therefore, the compression of compression space 25 is reversible, so that a deformation of vehicle frame 3 between the side rail and the cross member can be reversed. This reversibility is very important for certain vehicle types.

In principle, the embodiment depicted in FIG. 2 can also be used for pneumatically driven impact absorbers.

In accordance with the invention, a pressure sensor (marked in FIG. 2 by arrow 27) is integrated into a compression space 25. The pressure sensor makes it possible to exactly track the pressure changes within compression space 25 and to evaluate the insertion movement of cylinder element 23 into cylindrical section 21 in relation to controlling vehicle devices and especially safety devices.

By integrating the pressure-sensitive sensor into compression space 25 of the impact absorber 2, it is possible to trigger the airbags according to the severity of the accident based on the pressures applied. The severity of the accident is determined according to the course and the size of the pressure increase in impact absorber 2.

Because of the fact that many vehicles are already equipped with impact absorbers, by integrating a simple and cost-efficient pressure sensor in the impact absorber, the costs for additional sensors in a ZAE controller for airbag control as well as external up-front or early crash sensors can be eliminated. At the same time, accident detection by the pressure sensors in the impact absorbers is very reliable, because the cross member connected with the impact absorbers is the vehicle component that extends furthest and therefore is always impacted the first when a collision happens.

The pressure sensors can detect the course of an increase or change in pressure very precisely, which enables them to accurately detect and evaluate the acceleration of the components involved. This makes it possible to differentiate impact collisions like low and high speed collisions, where the course of acceleration is very similar. Depending on the course of the pressure changes, the airbag and/or a belt tightening device can be triggered. Of course, it is also possible to control other safety devices or vehicle components using the signals from the pressure sensor integrated in the impact absorber. The pressure signal not only serves to determine the collision speed and/or the insertion speed of the impact absorber and the severity of the collision, but also accelerations and time patterns for the respective controls.

We claim:

1. An impact absorption device for dampening an impact on a vehicle comprising a vehicle bumper being mounted to the vehicle through a compression element that can be compressed reversibly, wherein a pressure sensor is situated in the compression element which can detect the pressure during a compression process of the compression element, wherein the compression element comprises a compression space and a decompression space separate from said compression space.

2. An impact absorption device according to claim 1, wherein the compression element comprises a face plate which is mounted to the vehicle and a cylindrical section connected to said face plate and said cylindrical section receives a cylinder element which is mounted to said vehicle bumper.

3. An impact absorption device according to claim 1, wherein the compression element can be decompressed hydraulically or pneumatically.

4. An impact absorption device according to claim 3, wherein the sensor is located in the compression element's hydraulic fluid.

5. An impact absorption device according to claim 1, wherein the course and/or the amount of the pressure increase in the compression element can be registered by the sensor.

6. A safety system for a vehicle with an impact absorption device according to claim 1, wherein a safety device can be triggered by a signal from the pressure sensor.

7. A safety system according to claim 6, wherein the safety device includes an airbag and/or a belt tightening device.

8. An impact absorption device for dampening an impact on a vehicle, comprising a vehicle bumper, a compression element comprising a face plate which is mounted to the vehicle and a cylindrical section connected to said face plate and said cylindrical section receives a cylinder element which is mounted to said vehicle bumper, wherein the compression element can be compressed reversibly, and a pressure sensor arranged in the compression element which can detect the pressure during a compression process of the compression element.

9. An impact absorption device according to claim 8, further comprising a sleeve welded on said cylinder element wherein said vehicle bumper is screwed into said sleeve.

10. An impact absorption device according to claim 8, wherein the compression element can be decompressed hydraulically or pneumatically.

11. An impact absorption device according to claim 10, wherein the sensor is located in the compression element's hydraulic fluid.

12. An impact absorption device according to claim 8, wherein the course and/or the amount of the pressure increase in the compression element can be registered by the sensor.

13. A safety system for a vehicle with an impact absorption device according to claim 8, wherein a safety device can be triggered by a signal from the pressure sensor.

14. A safety system according to claim 13, wherein the safety device includes an airbag and/or a belt tightening device.

15. A vehicle according to claim 8, wherein the compression element comprises a compression space and a decompression space separate from said compression space.

16. A vehicle with an impact absorption device for dampening an impact on a vehicle component, comprising a vehicle bumper, a compression element comprising a face plate which is mounted to the vehicle and a cylindrical section connected to said face plate and said cylindrical section receives a cylinder element, a sleeve welded on said cylinder element wherein said vehicle bumper is screwed into said sleeve, wherein the compression element can be compressed reversibly, and a pressure sensor arranged in the compression element which can detect the pressure during a compression process of the compression element.

17. A vehicle according to claim 16, wherein the compression element comprises a compression space and a decompression space separate from said compression space.

18. A vehicle according to claim 17, wherein the compression element can be decompressed hydraulically or pneumatically.

19. A vehicle according to claim 16, wherein the sensor is located in the compression element's hydraulic fluid.

20. A vehicle according to claim 16, wherein the course and/or the amount of the pressure increase in the compression element can be registered by the sensor.

21. A vehicle according to claim 16, further comprising a safety system, wherein a safety device can be triggered by a signal from the pressure sensor.

22. A vehicle according to claim 21, wherein the safety device includes an airbag and/or a belt tightening device.

* * * * *